(12) United States Patent
Ginzboorg et al.

(10) Patent No.: US 6,240,091 B1
(45) Date of Patent: May 29, 2001

(54) IMPLEMENTATION OF ACCESS SERVICE

(75) Inventors: Philip Ginzboorg; Jan-Erik Gustav Ekberg; Pekka Johannes Laitinen, all of Helsinki; Antti Ylä-Jääski, Espoo, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 08/955,561

(22) Filed: Oct. 17, 1997

(30) Foreign Application Priority Data

Jul. 14, 1997 (FI) .......................................... 972980

(51) Int. Cl.[7] .................................................. H04L 12/44
(52) U.S. Cl. ........................ 370/401; 370/270; 370/389; 379/13; 709/229
(58) Field of Search ............................ 705/411; 370/352, 370/353, 355, 369, 469, 270, 401; 379/111, 114, 121, 130, 399, 13; 395/186, 187.01, 188.01, 200.59; 709/929

(56) References Cited

U.S. PATENT DOCUMENTS

| | | | |
|---|---|---|---|
| 5,148,474 | * | 9/1992 | Haralambopoulos et al. ...... 379/111 |
| 5,537,464 | * | 7/1996 | Lewis et al. ......................... 379/114 |
| 5,790,548 | * | 8/1998 | Sistanizadeh et al. ............... 370/352 |
| 5,796,727 | * | 8/1998 | Harrison et al. ..................... 370/338 |
| 5,822,411 | * | 10/1998 | Swale et al. .......................... 379/111 |
| 5,828,666 | * | 10/1998 | Focsaneanu et al. ................ 370/389 |
| 5,852,812 | * | 12/1998 | Reeder .................................. 705/39 |
| 5,854,897 | * | 12/1998 | Radziewicz et al. ................ 709/111 |
| 5,907,547 | * | 5/1999 | Foladare et al. ..................... 370/352 |
| 5,956,697 | * | 9/1999 | Usui ...................................... 705/32 |

OTHER PUBLICATIONS

R. Droms, Dynamic Host Configuration Protocol, RFC–1541, Oct. 27, 1993, 1–39.

* cited by examiner

Primary Examiner—Hassan Kizou
Assistant Examiner—Ahmed Elallam
(74) Attorney, Agent, or Firm—Altera Law Group LLC

(57) ABSTRACT

The invention relates to the implementation of an access service in a telecommunications network comprising an access network, a network providing services, and user-operated terminals which are connected to the access network. The access service is offered by connecting the user terminal to the network providing the services through interface elements which connect the access network and the network providing the services. As a response to the access service at least one charging record is generated. The record is transferred to billing means for billing the access service subscriber for the access service. So that it would be possible to combine the access service with reliable and versatile billing in a connectionless network, the terminal is used to generate charging messages which are provided with a subscriber-specific digital signature, and the signatures generated by the terminal are verified outside of the terminal. The terminal is given access to the network providing the services, if said messages are received in an acceptable manner. The terminal sends the network data about the subscriber associated with the current user of the terminal, whereby said data are used to verify the validity of the signatures and to target the charging messages received from the terminal at the billing of the subscriber in question.

31 Claims, 9 Drawing Sheets

| | | | |
|---|---|---|---|
| Name: | Philip Ginzboorg | Billing server: | NRC Watchdog 1 |
| | Itälahdenkatu 22 B | Billing server ID: | 423 3343 9730 |
| | 00210 Helsinki | | |
| | Finland | Billing date: | 24.6.1997 |
| E-mail: | philip.ginzboorg@research.nokia.com | | |
| Client ID: | 711 5655 6654 | | |

| | |
|---|---|
| Billing period: | 1.6.1997 - 15.6.1997 |
| Period fee: | 49,90 FIM |
| Service fee: | 68,41 FIM |
| TOTAL: | 118,31 FIM |

Used services:

| Service | Service type | Provider | Contract nr | Start time | Duration | PRICE |
|---|---|---|---|---|---|---|
| • | • | • | • | • | • | • |
| • | • | • | • | • | • | • |
| • | • | • | • | • | • | • |

FIG. 8
| TYPE | LENGTH | CONTRACT NUMBER |
|---|---|---|
| SEQUENCE NUMBER | | SERVICE IDENTIFIER |
| SERVICE TYPE | | STARTING TIME |
| IDENTIFIERS | | |
| METHOD OF PAYMENT | AMOUNT OF MONEY | TRAFFIC DATA |
| SIGNATURE | | |
CDR
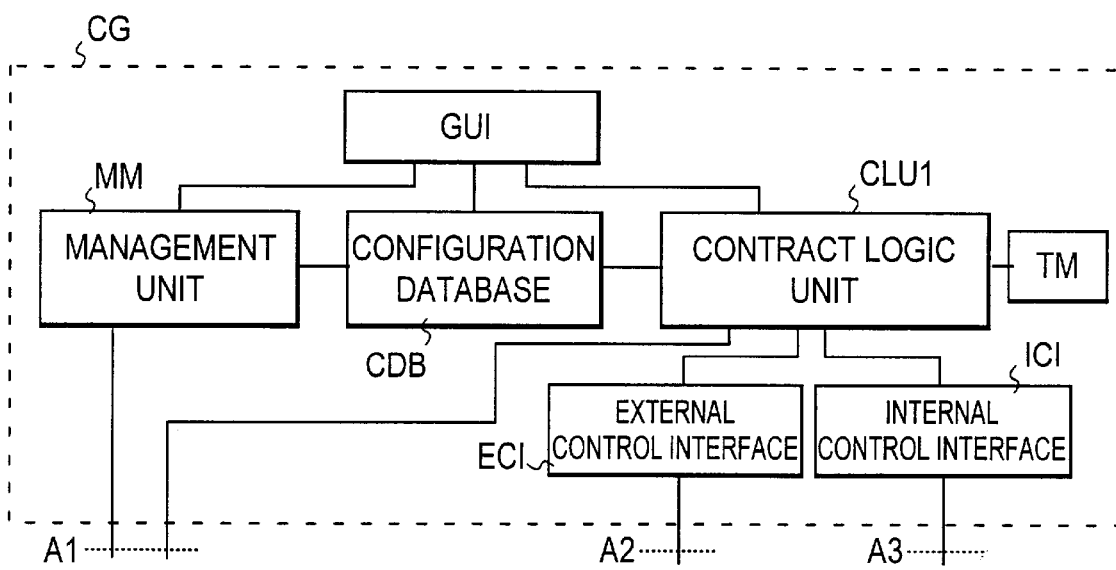
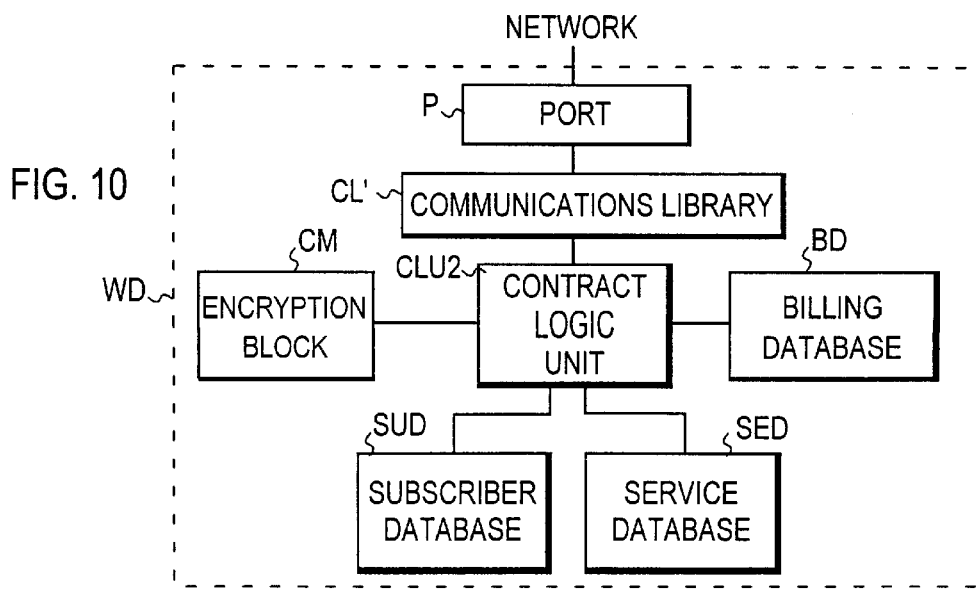
FIG. 9b
FIG. 10

IMPLEMENTATION OF ACCESS SERVICE

FIELD OF THE INVENTION

The invention is related in general to the implementation of access service in a telecommunications system, in particular to the implementation of charging in connection with access service. In this context the term 'access service' refers to a service which is used to give the user of a network, such as the subscriber of a telephone network or a LAN user, access to the network which provides the services, for example the Internet, or a section of the network from which the services are being provided.

BACKGROUND OF THE INVENTION

Optical fiber is a natural choice as the transmission medium for a trunk network, because trunk connections usually need a high transmission capacity, the transmission distances are long and often there are existing routes for cables. Even for subscriber connections (the line between the local exchange and the subscriber) the situation is rapidly changing, because various multimedia services that demand a high transmission rate will be delivered to the private consumer.

However, no great savings can be expected in the construction costs of the network which provides the future broadband services, because the costs are mostly due to the cable installation. On the one hand, it is desired that as much optical fiber as possible would be built on the subscriber network side as well, as it is evident that it will be needed in the future. On the other hand, the costs of renewing the subscriber network are extremely high, and the renewal will take decades. The high costs are thereby the worst obstacle in introducing the fiber on the subscriber network side.

It is because of the aforementioned reasons that studies are under way to determine the possibility of using the ordinary subscriber line (twisted pair cable) for high-speed data transmission, in other words, for speeds which clearly exceed the speed of the ISDN basic connection (144 kbit/s). The present ADSL (Asymmetrical Digital Subscriber Line) and HDSL (High bit rate Digital Subscriber Line) technologies offer new possibilities for high-speed data and video transmission via the telephone line to subscriber terminals.

The ADSL transmission connection is asymmetric so that the transmission rate from the network to the subscriber is significantly higher than that from the subscriber to the network. ADSL technology is mainly intended for various subscriber services (so-called "on-demand" services). In practice the speed of an ADSL transmission connection from the network to the subscriber is in the order of 2 to 6 Mbit/s and from the subscriber to the network in the order of 16 to 640 kbit/s.

The HDSL transmission technology relates to the transmission of a digital signal on the 2 Mbit/s level in a twisted pair cable. The HDSL technology is symmetric, in other words, the transmission speeds are equal in both directions. An individual HDSL transceiver system comprises transceivers which use echo cancellation technology and which are connected to one another via the two-way transmission path formed by the twisted pair cable. An HDSL transmission system can contain one, two or three such individual transceiver systems in parallel; in the case of two or three parallel pairs, the speed used in each parallel transmission connection is less than 2 Mbit/s; 784 kbit/s in the case of three parallel pairs and 1168 kbit/s in the case of two parallel pairs. International recommendations define how signals in the 2 Mbit/s level are transmitted in an HDSL system, such as, for example, the VC-12 signals of the SDH network or the 2048 kbit/s signals which comply with the CCITT recommendations G.703/G.704.

Because the aforementioned solutions only provide speeds in the order of 1 to 6 Mbit/s, the industry has also searched for a technology for the subscriber line that would provide ATM level speeds (10 to 55 Mbit/s). The international standardization organization ETSI (European Telecommunications Standards Institute) is in the process of creating a specification for VDSL (Very high data rate Digital Subscriber Line) devices which would make these kinds of speeds possible. VDSL technology can be used to implement both symmetric and asymmetric connections.

The aforementioned technologies that are used to transmit fast data via a twisted pair cable are referred to by the joint abbreviation xDSL. Therefore, even though it is not yet possible to provide broadband services to end users by using optical fiber, with these technologies teleoperators can provide the said services by using the existing subscriber lines. Because ADSL seems, at the moment, to be the most promising technology for implementation of broadband services, it is used as the example of the connection technology that provides the services.

The ADSL Forum has defined a network model relating to general xDSL connections. This model is illustrated in FIG. 1. The device which connects to the line at the user end is called ATU-R (ADSL Transmission Unit—Remote), and the device which connects to the line at the network end (in the local exchange) is called ATU-C (ADSL Transmission Unit—Central). These devices are also called ADSL modems (or ADSL transceivers) and they create an ADSL link between one another. The high-speed data of the ADSL connection are connected to the subscriber line so that the subscriber can still use the POTS services, but he or she is additionally provided with a high-speed data connection. These narrow- and broadband services are separated from one another by using a filter PS (POTS-splitter) which performs the frequency separation of ADSL signals and narrowband signals.

The terminals TE located at the end user can be of several types, for example, cable TV terminals TE1, personal computers TE2, or ISDN telephones TE3. For each terminal the system includes a service module SMi (i–1 . . . 3) which performs the functions related to terminal adaption. Such service modules can include, in practice, for example, so-called Set Top Boxes, PC interfaces, or LAN routers. The distribution network PDN (Premises Distribution Network) located in the premises of the subscriber connects the ATU-R to the service modules.

At the network end of the ADSL link the access node AN forms a concentration point for data, in which point the traffic which arrives from different service systems via different networks is concentrated. The access node is located, for example, at the central office.

In FIG. 1 the reference symbol A indicates the private part of the network, reference symbol B the public part of the network, and reference symbol C the network located at the subscriber premises.

The problem in a network of the type described above is how the end user is charged for the access service (i.e. for the use of the subscriber line) when he or she uses the services provided by the service systems, for example, Internet services. It is desirable that the charging is based on time or the volume of transmitted data, or both. The problem is caused, firstly, by the fact that the network can be connectionless. In other words, in this case the network does not feature messages for establishing and releasing a connection (such as SETUP and RELEASE), so the charging cannot be performed in the manner of the current telephone network on the basis of connection setup and release events. Secondly, the manufacturers of xDSL modems have not equipped their devices so that they could be used for charging on the basis of time or the volume of data transmitted. So it is not possible to query the modems for the information required for charging.

Let it be further noted that if the terminal is an ISDN or ATM terminal, each session is started with a SETUP message and finished with a RELEASE message, in which case time-based charging can be implemented by using the usual method. The aforementioned problem thereby relates to networks in which the network between the terminal and the access node, or at least for the link between the terminal TE and the delivery network PDN, is connectionless. Specifically, it is possible to implement the transmission path between the terminal and the access node, for example, in such a manner that the section between the access node and ATU-R is of the connection-oriented type (for example, ATM-based) and the section between the ATU-R and the terminal is connectionless (for example, an Ethernet link).

The problem is especially pertinent to the situation in which different customers use the same subscriber line because, in this case, the customers cannot be distinguished according to the subscriber line. This kind of a situation occurs, for example, when the general public is offered access to broadband services by placing the terminal in public premises, i.e., in a library or in a shopping center. The same problem is also encountered when it is desired, for example to work remotely (i.e. to telecommute) by connecting to the LAN of one's own employer only. In this case it is not possible either to detect that the charges for the access session in question should be addressed to the employer instead of the employee. The system cannot thereby distinguish when a person uses the connection as a so-called business user (whose charges are paid for by the employer) and when as a private user (who pays the charges himself or herself).

From now on the term "user" is used to refer to the person who uses the terminal, and the term "subscriber" is used to refer to the organization or person who pays for the use of the service. A user can also be a subscriber.

SUMMARY OF THE INVENTION

The purpose of the invention is to eliminate the drawbacks described above and create a solution which can be used to implement an access service in a connectionless network by using as simple equipment as possible so that it is also possible to connect a reliable and versatile charging system to the service in situations in which the bill must be sent to an address other than that determined by the subscriber line or to a person other than the subscriber identified by the network address of the terminal.

This goal can be attained by using the solution defined in independent patent claims.

The basic idea of the invention is to allow or prevent the access of the user to the network on the basis of the current source address of the terminal (for example, Internet Protocol (IP) address) and to distinguish the users of the same source address by generating charging-related messages in the terminal at frequent intervals, for example, accounting records which are furnished with the subscriber-specific digital signature. The terminal notifies the identity of the subscriber associated with the current user to the system so that the signatures can be verified by using the data of the correct subscriber.

The system is, in principle, such that all factors essential for data security can be easily implemented: authentication, data integrity, non-repudiation (a party to the data transmission cannot deny participation in the transaction) and privacy (an eavesdropper cannot interpret any captured data).

One significant additional advantage of the system is that it can simultaneously perform charging for the services used by the customer after he or she has received access to the network which provides the services, for example, the Internet. From the terminal display the customer can see simultaneously the charging data about the connection itself and the used services. Also, the customer will receive all charging data in itemized form in the same periodical (for example, monthly) bill.

The system can also use any billing system that already exists in the telephone network and it does not require new solutions or investments for this part.

BRIEF DESCRIPTION OF THE DRAWINGS

In the following, the invention and its preferred embodiments are described in detail referring to examples 2 to 12 in the attached figures:

FIG. 8 illustrates the structure and contents of a charging record, FIG. 9b shows in detail the structure of the CDR generator shown in FIG. 9a, FIG. 10 illustrates the structure of the charging server as a functional block diagram.

DETAILED DESCRIPTION OF THE INVENTION

Figure 1:
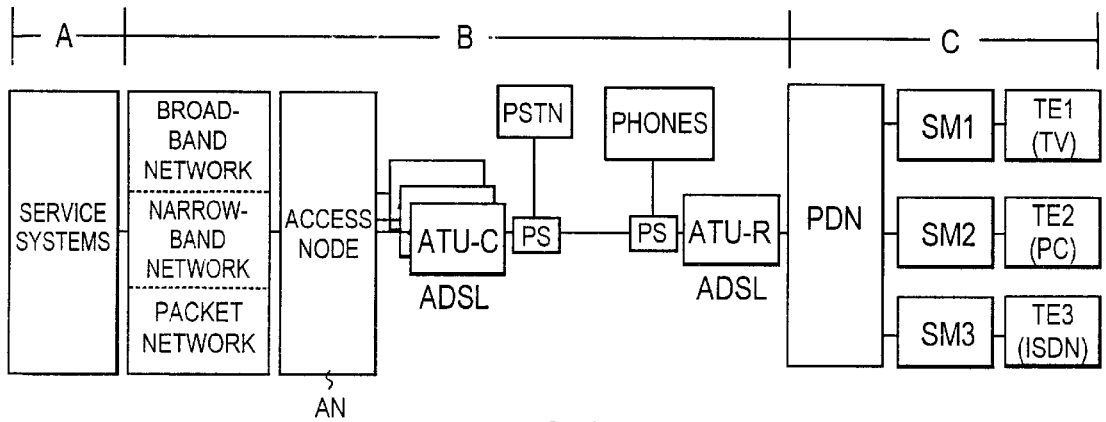
FIG. 1 illustrates the general network model specified by the ADSL Forum.

In the following, the operating environment of the invention is described in detail by referring to an example according to FIG. 2 in which the general network model according to FIG. 1 is implemented in simplified form. It is assumed that there is in the network an operator ISP which provides Internet services and which is called in this context the access service provider. This example only shows one terminal which is typically a personal computer PC equipped with a network interface (for example, Ethernet card) and connected via the LAN cable LC1 (for example, 10BaseT) to the ADSL modem A1 which is in turn connected via an ordinary subscriber line SL to the ADSL modem A2 which is located in the premises of the access service provider. The twisted pair cables which function as subscriber lines terminate in the telephone operator exchange, so in order to achieve the maximum distance the modem A2 must be located at the exchange premises.

In this case it is therefore assumed that the operator which provides Internet services is also a telephone operator. POTS splitter, however, makes a situation possible in which the telephone operator only provides telephone services and rents a connection to another service provider to provide broadband services. In the future the antitrust legislation may even force telephone operators towards this kind of operation if they do not offer broadband services themselves.

Figure 2:
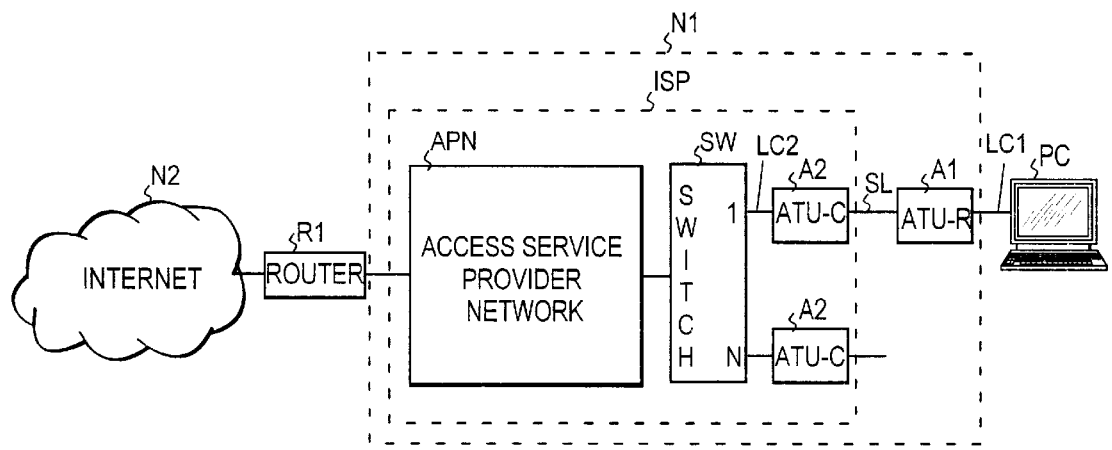
FIG. 2 shows a network environment in which a method according to the invention can be used.

In the network of FIG. 2 the network PDN located in the end user premises is thereby reduced to a point-to-point connection between the terminal and the access service provider. The modem A2 is connected via the LAN cable LC2 (for example, 10BaseT) to the LAN switch SW of the service provider. The switch connects various subscriber connections to the access service provider network APN which is connected to the Internet via the router R1 which operates as a gateway. The access network part of the system is indicated in FIG. 2 by the reference symbol N1 and the external network which provides services by the reference symbol N2. The access network can also be regarded as the part of the network which connects the terminals to the part of the network which provides services (so the router R1 can also be regarded as a part of the access network).

In this example, Ethernet frames are transmitted across an ADSL connection and the modem pair operates as a bridge between the LAN segment of the subscriber and the LAN segment of the access service provider. In practice, the LAN switch can be, for example, Centillion 100, manufactured by Bay Network, USA, or Catalyst 3000, manufactured by Cisco Systems, USA.

Figure 3A:
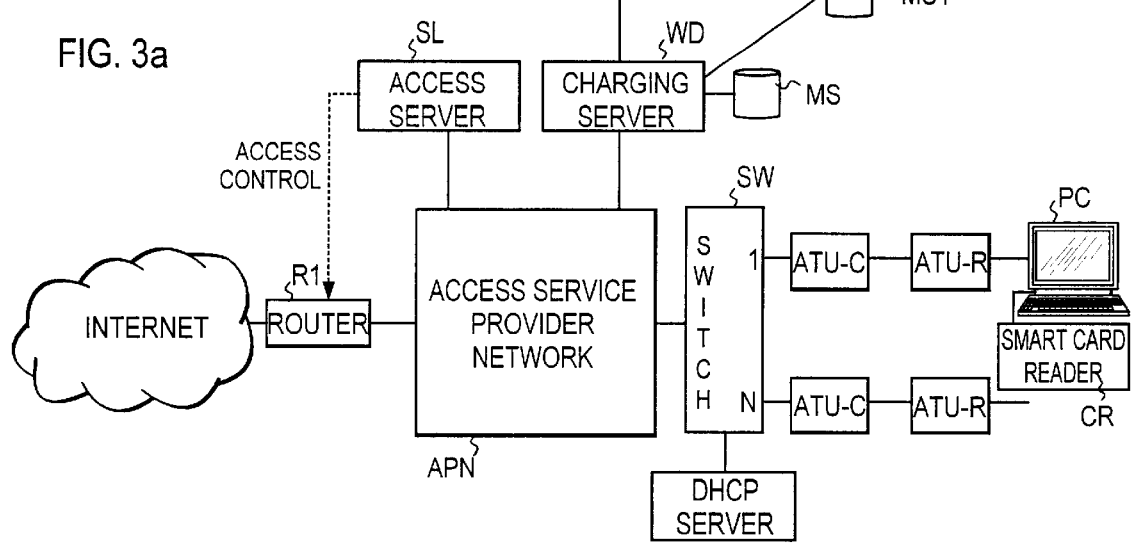
FIGS. 3a and 3b show a system according to the invention in a network environment according to FIG. 2, FIGS. 3c and 3d show alternatives to the systems of FIGS. 3a and 3b.

FIG. 3a illustrates how the method according to the invention is applied in a network environment according to FIG. 2. The end user terminal (a personal computer) includes a smart card reader CR and each customer has a personal smart card by which the customer (subscriber) is recognized. Additionally, the terminal includes a program library which communicates with the smart card, and software which generates at specific intervals during the connection (for example, once a minute) a charging record furnished with a digital signature and sends it in the network.

A charging server WD which verifies and collects the charging records generated by the terminals is connected to the network APN of the access service provider. The network can include several different charging servers, but each terminal has, however, a dedicated charging server. The charging server includes a memory MS, a magnetic tape for example, which is used for storing all charging records which the charging server has accepted. The gathered charging records are transferred periodically to the billing system BS which is preferably an existing billing system in the public switched telephone network PSTN or, for example, a system similar to the existing billing system, but located in a broadband network. The network NW1, which is shown in general level in the figure, and through which the charging server is connected to the billing system, can thereby be the public telephone network or, for example, a packet or data network. The charging server can also be directly connected to the billing system. Before transfer to the billing system the charging records can be stored temporarily in a mass memory device MS1 which operates as an intermediate storage facility and whose purpose is described later.

Additionally, an access server SL has been connected to the network of the access service provider. The function of the access server SL is to open and close Internet connections by controlling the router/concentrator R1, which functions as the connecting component between the access network and the network that provides the services.

In a preferable embodiment the system includes a known DHCP server (Dynamic Host Configuration Protocol) for dynamic allocation of IP addresses to terminals. In dynamic address allocation the address returns to the pool of addresses to be allocated when the connection is terminated or when a pre-determined "rent period" of the address expires. (DHCP is described in R. Droms :*Dynamic Host Configuration Protocol*, RFC-1541, Oct. 27, 1993.)

The charging and access servers are preferably located in the premises of the access service provider and they need not be physically separate but they can be integrated in the same machine. The charging server especially can also be located in the Internet side of the system, especially if the charging server is owned by a separate organization which offers billing services to several different access service providers. Logically, the location of the charging server has no significance, but in practice the selection of the location is affected, for example, by the following factors: First, it is advantageous to place the charging server in connection with or near the public telephone network so that it has easy access to the existing billing system of the telephone network. As regards efficiency, it is essential that the connection between the terminal and the charging server is as fast as possible and that the delay is easily controlled (which is not the case at present, if the charging server is, for example, many hops away in the Internet). As the purpose of the system is also to provide local service (in a geographically limited area) so that the customers are billed for the services, for example, once a month, it is not sensible to locate the charging server far from the customers.

The POTS splitter has been left out of FIGS. 2 and 3a (cf. FIG. 1), because the POTS splitter can also be integrated in the ATU.

Figure 3B:
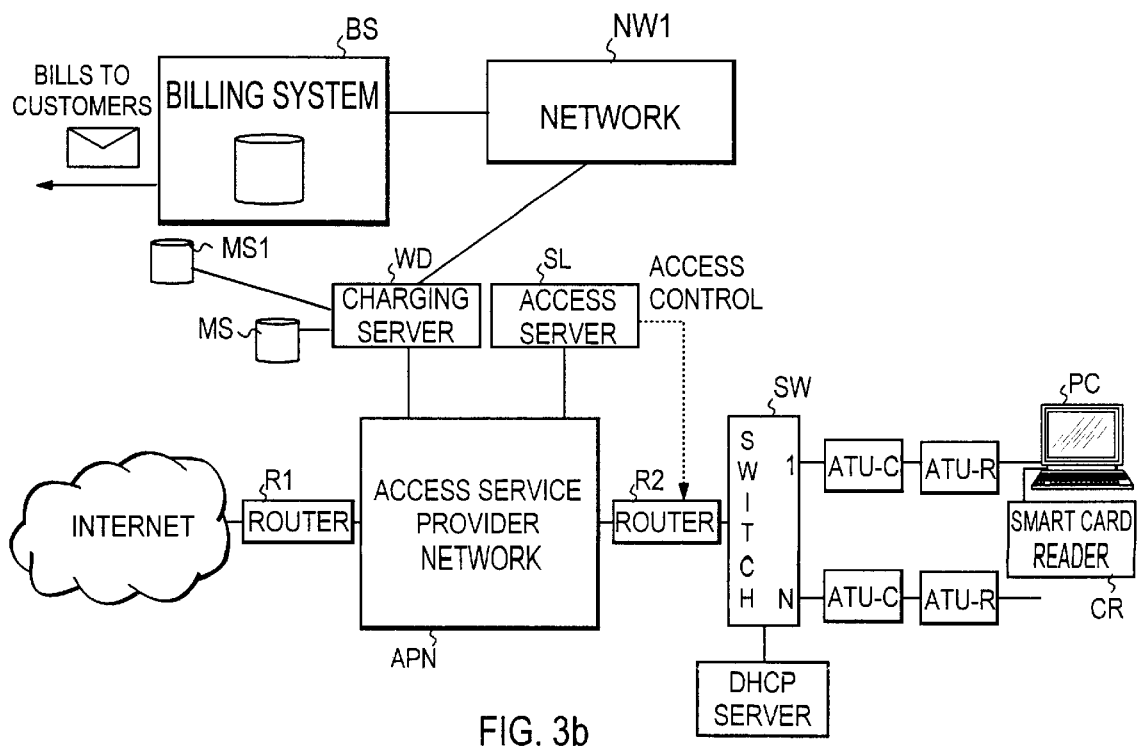

FIG. 3b shows an alternative system which is otherwise similar to the system in FIG. 3a, but between the access service provider network APN and the switch SW there is a router R2 which, in this case, is the router controlled by the access server. The access control point can thereby be located at either router. The router R2 routes the traffic from terminals either to the servers located in the access service provider network or to the router R1. It is also possible that there are access control points at both routers. This situation may occur, for example, when a part of the services is located in the access network and a part is located elsewhere.

Figure 3C:
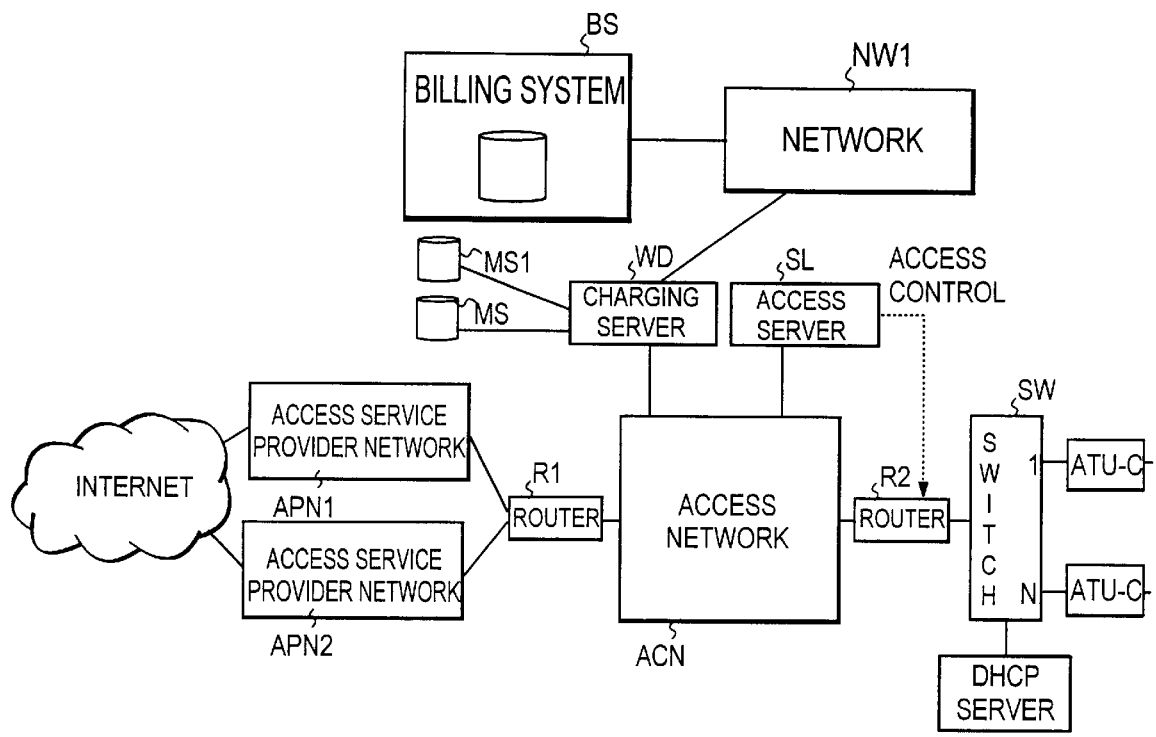
Figure 3D:
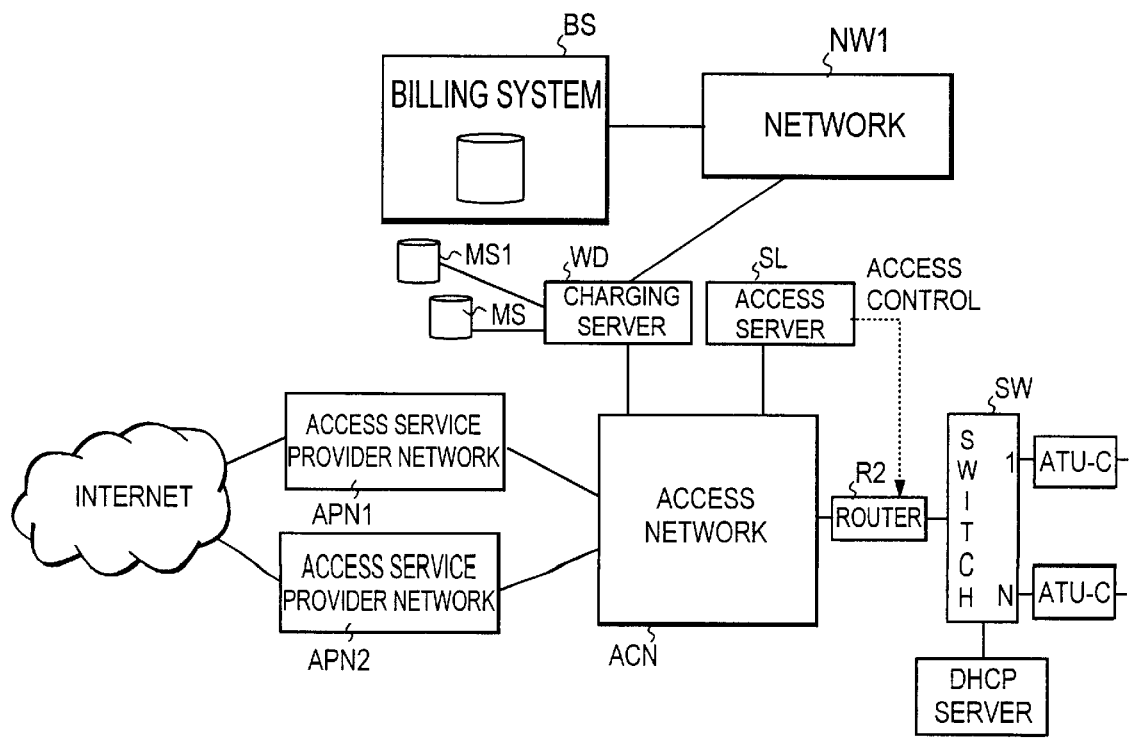

FIGS. 3c and 3d show two other alternative networks. In the case of FIG. 3c several different access service providers are connected to a shared router R1 which is connected via a separate access network ACN to the router controlled by the access server. In the case of FIG. 3d the access service providers have their own routers (not shown) so their networks are directly connected to the access network.

According to a preferred embodiment of the invention the transmission connections between both the access server and the access control point and between the access server and the charging server are secure so that the privacy of the transmitted data is ensured. This can be implemented either physically by using a dedicated transfer medium which others cannot access between the parts in question (point-to-point connections) or by using an encrypted transmission channel between the parts in question. The use of secure transmission connections prevents fraudulent use of the system.

Figure 4:
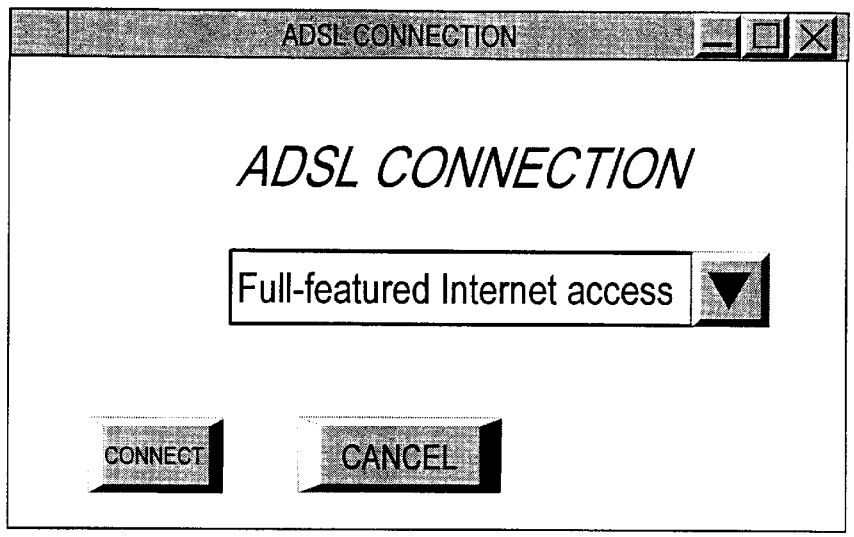
FIG. 4 shows a selection window which opens on the display of the subscriber terminal.
Figure 6:
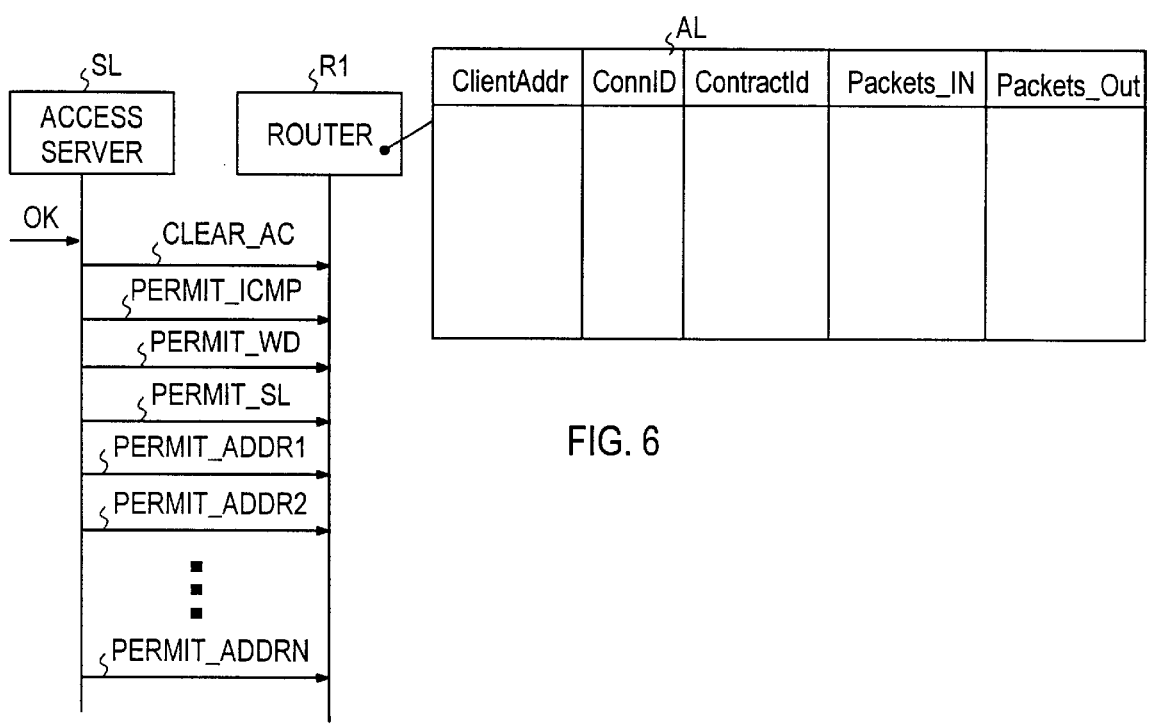
FIG. 6 illustrates in detail the operation between the access server and router.
Figure 5:
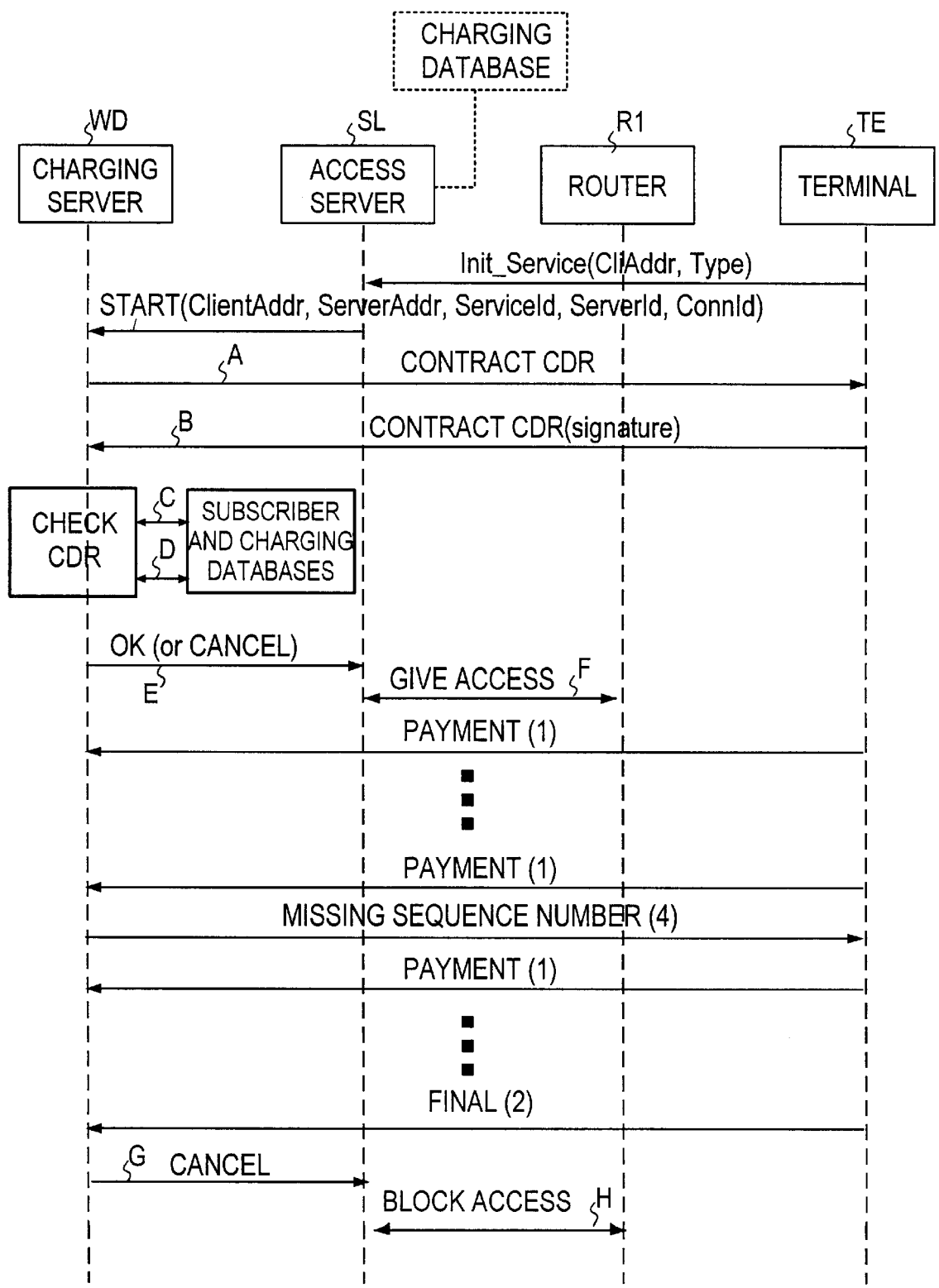
FIG. 5 illustrates the message exchange between different components of the system.

The following describes in closer detail the operation of a system according to the invention by referring to FIGS. 4 to 6. The description assumes that the system conforms to FIG. 3a.

Charging can start when the user inserts the smart card into the card reader which is connected to the terminal. As a result of this the program located in the terminal opens a window in the terminal display. This window is called a selection window. FIG. 4 illustrates an example of the selection window. From the drop-down list of the selection window the user can select the type of connection required. The connections can be divided into different types, for example, by having the system feature connections different to the full-featured Internet connection, such as a continuous connection to the E-mail server by which the user receives notification of arriving E-mail messages in real-time. The latter service can be significantly cheaper (for example, 2 FIM/day) than a full-featured Internet connection. This kind of limited connection can be created to servers other than the E-mail server, for example, to the workplace LAN server. From the menu the user can additionally select, say, the desired operator and make a selection between an encrypted and a non-encrypted connection.

The services which can be selected from the drop-down list of the selection window can be stored in the terminal or the smart card, so the selection window can be opened before the terminal establishes a connection to the network. Alternatively, the terminal can first automatically retrieve the most recent service list from the access server, charging server, or another network server, immediately after the user has inserted the smart card into the reader. This alternative results in a slightly longer delay but, on the other hand, the user can always select from the latest services and, additionally, he or she is informed of the latest prices. The service alternatives included in the selection window can also be updated automatically during the connection, in which case the terminal (or the smart card) always has a record of the services which were offered during the last access session.

The smart card includes a record of the user profile data which are, in this example, the user name (for example, in ASCII form), user identifier number, public and private keys of the user and the balance of the user's bill. The public key can be both readable and available for use. On the other hand, the private key can only be available for use (it cannot be read from the card). Availability for use means that the key in question can be used to create and check a digital signature, or encrypt and decrypt data. The balance of the bill is the sum which the subscriber in question has paid (this sum can be zeroed at any time so it is not the same as the final balance of the actual bill, which means that it only functions as a reference to the user of the terminal). Additionally, it is possible to store on the smart card, for example, the public key of the charging server so that it can be ensured that the messages actually come from the charging server.

Subscriber data, such as name, identifier, and private key can be stored in the terminal memory (for example, on the computer hard disk or diskette) instead of in the smart card, if a lesser level of data security is acceptable.

FIG. 5 illustrates the communication between the various components of the system. When the user clicks the Connect button of the selection window, the terminal software sends the service request message Init_Service to the access server SL (FIG. 5). The service request message includes at least the current IP address of the terminal (ClientAddr) and the service type (Type) selected from the aforementioned menu. The access server verifies the message and further sends the start message START to the charging server WD. The start message includes the current IP address of the user (ClientAddr), the address which must be notified when the user terminates paying (ServerAddr), the service identifier (ServiceId), access server identifier (ServerId) and (temporary) identifier (ConnId) which is used to recognize different message types in the connection between the servers (START and messages OK and CANCEL which are described later).

On the basis of the information received the charging server WD generates a charging record (CDR, Charging Data Record) of a certain type which includes, among other things, the contract data related to the access session and the contract number assigned to the session in question. The contract number identifies this access service session. The structure of this charging record is illustrated in a later description which relates to the structure of all charging records. The charging server sends this starting charging record (contract CDR) to the terminal (arrow A, FIG. 5). The terminal returns the charging record related to the contract to the charging server, provided, however, with the digital signature (FIG. 5, arrow B). The digital signature refers to a known encryption algorithm which is based on a pair of keys and in which the encryption is performed by using the private key, in which case anyone can decrypt the message by using the public key. In this way the confidentiality of the message is thereby lost, but it can be used to verify that the message has come from the correct source. Thus, the sender cannot later deny the fact that he/she has sent the message. When using a digital signature, the entire message is normally not encrypted, only the digest formed from the message. The digest is a sort of check sum. From the encryption point of view, this digest is very strong and an outsider cannot create a message which would have an identical digest. The digest and the time stamp are encrypted by using the sender's private key and these form the digital signature. There are several different known options for implementing the signature. However, as the invention is not related to the signing of messages, the implementation of signatures is not described in more detail here. Anyone interested in the matter can find more detailed information from several books describing the field (see for example, Schneier, Applied Cryptography, ISBN 0-471-11709-9, Wiley & Sons, 1996).

The terminal can perform the signing of the contract CDR (accept the contract) automatically as described above, or the terminal can, after having received the contract CDR from the charging server, open on the display, for example, a separate contract window which is used to ask the user once more for acceptance of the access service contract. When the user clicks the accept button of the window, the terminal sends the signed contract CDR to the charging server.

After having received the signed contract CDR the charging server WD verifies the signature by using a known method in order to authenticate the CDR. For this purpose the charging server retrieves from its subscriber database the public key for the customer in question (arrow C).

There are several methods for finding the correct public key. First, the terminal can, when it receives the contract CDR for signing, retrieve the customer's (subscriber's) name and identifier from the smart card and add the data in question to the signed contract CDR which it sends to the charging server. The charging server uses an identifier number when it retrieves the correct public key from its subscriber database. The second alternative is that the charging server checks the customer identity and right to access the system before the contract CDR is formed. When the charging server receives the START message from the access server, it sends an authentication request (not shown in the figure) to the IP address included in the START message. The terminal includes in the response, in addition to the customer identifier number, possibly other customer-specific information, adds the signature to the response and sends the signed response to the charging server. The advantage of this alternative is that the charging server knows the identity of the user before the contract is formed so that it is possible to form customer-specific tailored contracts (for example, different prices for different customers). The drawback is, naturally, the need for two extra messages which slows down the establishment of the connection. The third alternative is that the terminal already includes the customer identifier number in the Init_Service message, and the access server further sends the identifier to the charging server in the START message. In this alternative thereby both the charging server and the access server know the customer identifier number. This can be a drawback if the charging server and the access server belong to different organizations. This possible drawback can be "fixed" in the following manner. The customer identifier is formed of two parts. The first part identifies the customer origin (i.e. the customer's own charging server). This part is used to route the START message to the charging server in question. The second part is encrypted by using the public key of the customer's own charging server so that it is not recognized by the access server. The customer identifier can also be made to seem different during each instance of service, for example, by attaching it to a character string of constant length which changes during each instance of service, for example, it may be a function of time. (The customer identifier is thereby formed of the area code and signature. The area code is needed if the ADSL connection users have contracts with different (several) charging service providers.)

The charging server stores the accepted contract CDR in its charging database (arrow D) for some time in case the customer makes a reclamation on the service in question at a later date. After this the charging server asks the access server to give the customer access to the network (arrow E) by sending to the access server an OK message which includes the aforementioned identifier (ConnId) which is used to identify the messages of the connection, and the contract number (ContractId) assigned to the service session. The access server, in turn, controls the router R1 to allow the customer to access the (Internet) network. This process is described in FIG. 5 by arrow F and it is described in more detail later in connection with FIG. 6.

After this the user can access the network. This phase, during which the user uses the services provided by the network, is described in more detail later.

If the charging server does not accept the charging record (for example, if the signature is incorrect), instead of sending the message OK, it sends the message CANCEL which includes the same fields as the message OK, although the contract number is not needed at this point because the user is not given access to the network.

When the connection is disconnected after the user finishes using the connection, a similar CANCEL message is sent (arrow G), but because the connection at this point disconnects in a normal fashion, the contract number included in the message must also be used. CANCEL messages are therefore structurally similar but they are used in a different manner depending on in which phase of the connection they arrive.

The starting message sent by the terminal can also be sent directly to the charging server. By sending the starting message from the terminal to the access server first, the charging server interface can, however, be implemented identically for all service providers, so that, in addition to the access server, the charging server can handle the charging for other service providers also. If the characteristics of the router are such that it could detect the traffic which starts in a certain source address and notify the access server about the traffic, the starting message would not be needed at all.

FIG. 6 illustrates in more detail the communication between the access server and the router during the opening phase of connection (FIG. 5, arrow F). In this example it is assumed that the connection between the access server and router is a known Telnet connection because the SNMP protocol (Simple Network Management Protocol) cannot yet be used to update the access lists of the router in question.

The access server SL controls the interface of the router R1 through which the user gains access to the Internet. The access list AL is stored in the router. This list can include, according to FIG. 6, for example, five columns so that the first column shows the IP addresses (ClientAddr) of the terminals which can use the interface in question to access the Internet, the second column shows the aforementioned connection identifier (ConnId), the third column the contract identifier (ContractId), the fourth column the total of incoming packets, and the fifth column the total of outgoing packets. There can be a similar list for both transmission directions of the interface.

When the access server SL has received the message OK from the charging server, it first sends the router the command which clears the access list. This command is indicated by the reference symbol CLEAR_AC. After this the access server sends the command which allows all control messages of the Internet protocol to pass through (PERMIT_ICMP). If the charging server and/or the access server are on the Internet side of the router R1, the access server then sends the commands which enable all connections to the charging server and/or access server (PERMIT_WD and/or PERMIT_SL). Finally the access server sends the command which permits access for a specific terminal through the interface. One of these commands is sent for each ongoing connection (PERMIT_ADDR1 . . . PERMIT_ADDRN). As a result of the commands the router updates the access list. For each new connection a similar update is performed. In other words, the entire list is first cleared and after that the list is rewritten with the new terminal added to the list.

For access list update the charging server sends the addresses of the terminals which currently pay for the access to the network providing the services, or at least the data about changes compared to the previous access list.

When the user finishes using the connection, the charging server sends a CANCEL message to the access server (FIG.

5, arrow G). As a result of this the access server updates the access list in the manner described above so that the user in question is removed from the list during the update. This process is indicated by the arrow H in FIG. 5.

If connections are established and disconnected so rapidly that maintaining the list in the above manner is too slow, the router can store several updating events and include all events at once in the new access list.

In practice, the process described above can be used, for example, in the CISCO router model 7000 which is equipped, for example with the IOS 11.2 operating system. As referred to above, later on routers will probably include features which can be used to update the access list in a more efficient manner, in which case the changes can be made only for those items where they are needed.

When the connection has been opened, the services provided by the Internet can be used from the terminal. To keep the connection open, the terminal generates charging records at frequent intervals, sends them to the smart card for the digital signature and sends the signed charging record further to the charging server which stores the accepted charging records in its charging database.

When the user has access via the router R1 to the services of the Internet, he/she can use his/her service browser (which can be, for example, a known WWW browser) to find suitable services from the Internet and to make other contracts with the providers of the services in question. When the customer finds a suitable service, such as a Video-on-Demand service, he/she selects the service by, for example, clicking the alternative in question.

When the customer has made the selection, the server of the service provider sends to the charging server WD the service identifier which identifies the movie in question and the identifier which corresponds to the customer in question. The server determines the identifier, for example, on the basis of the source address of the messages received from the customer's browser program (for example, the socket address of the TCP connection).

After this the charging server WD starts the process which handles the usage of the service in question. First the charging server retrieves from the service database the parameters corresponding to the service in question, and sends to the terminal the contract CDR which contains the charging parameters to be used during the service session in question and the contract number. After receiving a charging record which starts this kind of a service, the terminal program opens a window on the terminal display. This window is from now on referred to as a contract window. On the basis of the information received from the charging service, the window displays the basic data about the different parties and the service in question. Additionally, the window displays the contract number, which identifies this particular service session. This contract thereby only covers a certain service, for example, the viewing of the selected movie and it is a completely separate service from the access service. In parallel with the charging for the access service the system thereby simultaneously performs charging for other services. This charging can occur, for example, on the basis of the service content.

Figure 7A:
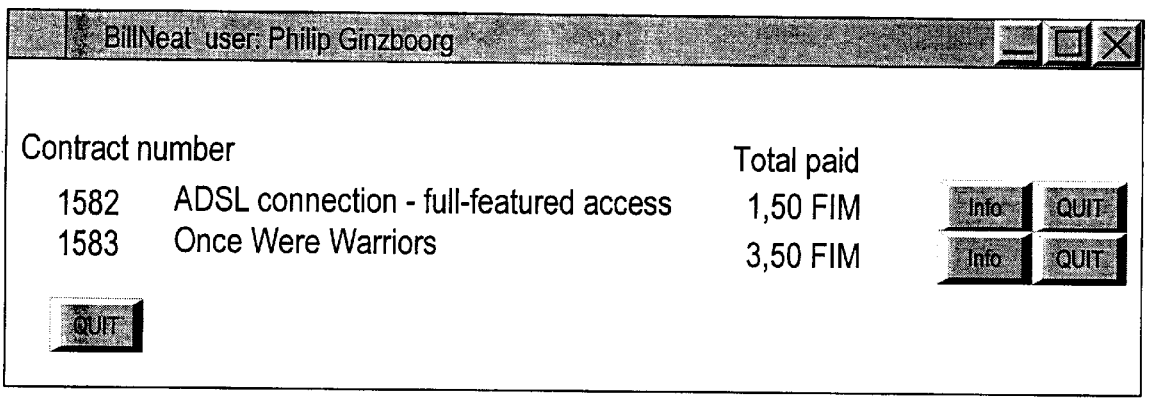
FIG. 7a illustrates the main window of the terminal.

All contracts which are in force at each moment are displayed in the main window of the terminal (FIG. 7a). As the charging for Internet services which is based on the service content does not belong in the actual basic idea of the invention, it is not described in this application in more detail. This charging is described in more detail in the earlier FI patent application 964524 of the applicant (confidential at the moment of submission of the present application).

The charging server verifies the origin of each charging record by using the public key of the customer (subscriber) in question, and stores the accepted charging records in the charging database. Each CDR to be sent from the terminal to the charging server represents the connection charging for a certain time interval and includes a contract number which is used to separate different services from one another. Because different users of the system cannot simultaneously use the same terminal, the signatures of the charging records which arrive from the same source address remain the same during a single access session. All records of this kind are collected together on a subscriber- and contract number-specific basis. For each service (for example, access service) the total charges are determined by adding together the charged amounts from all charging records which are related to the same contract number.

From the charging database of the charging server the CDRs are periodically transferred to the billing system BS (FIG. 3) where they are used to form bills by using a known method. The bills are sent to the customers. One bill contains a list of charges for all of the services that the customer has used during the charging period (for example, one month). The bill can be delivered as a printed copy via mail, or in electronic form to the terminal. FIG. 7b illustrates a bill which is sent to the customer. The bill contains the subscriber data and a list of the services used during the charging period. For each service the bill can show, for example, the service type, service provider, contract number used to receive the service, starting time and duration of the service, and the price.

Since the operation of the billing system is known, it is not described in more detail here.

There can be, for example, nine different types (0 to 8) of charging records (charging messages) in the system as follows:

0. Contract: This is the initial charging record (arrow A, FIG. 5) that the charging server sends (unsigned) to the customer and that the terminal returns to the charging server signed, if the customer accepts the contract.

1. Payment: This type of charging record is sent with a signature during a service session from the customer's terminal to the charging server, which verifies it.

2. Final: This type of CDR corresponds to type 1 in other respects, but it includes as additional information a statement that it is the last CDR the terminal is going to send during the current service session. When the user terminates the service him/herself by pressing the Finish button, the terminal first sends a CDR of type 1 and after that a CDR of type 6. In this manner the charging server can distinguish a user-initiated termination from a normal termination of the service (such as the ending of the movie). This kind of a record can also be used for one-time charges.

3. Pulse: This type of CDR is sent from the charging server to the terminal. The purpose is to tell the terminal that it should send a new CDR, if the service is to be continued. If the terminal does not send a valid CDR during a specified period, the charging server sends an interruption message to the server of the service provider.

4. Missing sequence number: This is sent from the charging server to the terminal (during a continuous billing contract) to notify that a CDR having a certain sequence number has not arrived at the charging server or that the CDR was not valid. In this case the terminal can send the CDR again to correct the situation. However, this kind of functionality is not necessary for either party. If the terminal does not answer this type of CDR, the best option is that the billing system has no right to charge for the portion of the missing CDR.

5. Modified contract: This type of CDR is sent from the charging server to the customer and it corresponds to type 0 charging records in other respects, but it does not have a new contract number. The contract number is the same as the number of the short-term contract in use at that moment. This charging record is sent during a service session to notify that the charging parameters have changed. The terminal can, for example, accept the new contract automatically, if the price has been decreased; in other cases the customer's acceptance may be required.

6. Abort: This type of CDR can be sent in either direction to indicate that the contract is to be terminated. The sender signs the CDR.

7. Digital cash: It is also possible to utilize the system in such a way that a CDR (type 1 or 2) connected to a certain payment includes the payment in digital cash. However, the charging server does not transfer the digital cash into the billing system. The charging server transfers it directly, for example, to the bank server (always when it has collected a certain, relatively small, amount of digital cash) or to a network server maintained by some other organization, which charges the customer's account directly. In addition to the centralized billing system BS, digital cash can be used for normal electronic trade or as an alternative implementation instead of a centralized billing system.

8. Synchronization of charging: This is sent from the charging server to the terminal (during a continuous charging contract) to inform that the payment CDRs do not cover the per-minute charges of the continuous contract (for example, the terminal clock is running too slowly). The synchronization CDR includes information about how much the customer should pay to keep the contract in effect.

FIG. 5 illustrates the charging for one service. The type of each message is stated above the arrow representing the message. The figure illustrates a case in which the charging server notices once during the service that a certain charging record is missing.

Depending on the number of processes executed simultaneously on the terminal, the time between two consecutive type 1 CDRs can vary. If the load of the terminal increases very much and the CDR generation is delayed from the nominal value, the charge included in the CDR is correspondingly greater.

In practice, continuous charging contains two time-related problems. First, one or more payment CDRs may be lost because of a failure or an error. Second, the terminal clock may run slower than the charging server clock. To eliminate these problems two threshold values (A and B) are defined. The first threshold value (A) is the maximum outstanding debt that the user can have to the charging server because of use yet unpaid for. The second threshold (B) is the maximum value of outstanding debt after payment. Both limiting values are linked to independent timer values ($T_A$ and $T_B$).

Figure 7C:
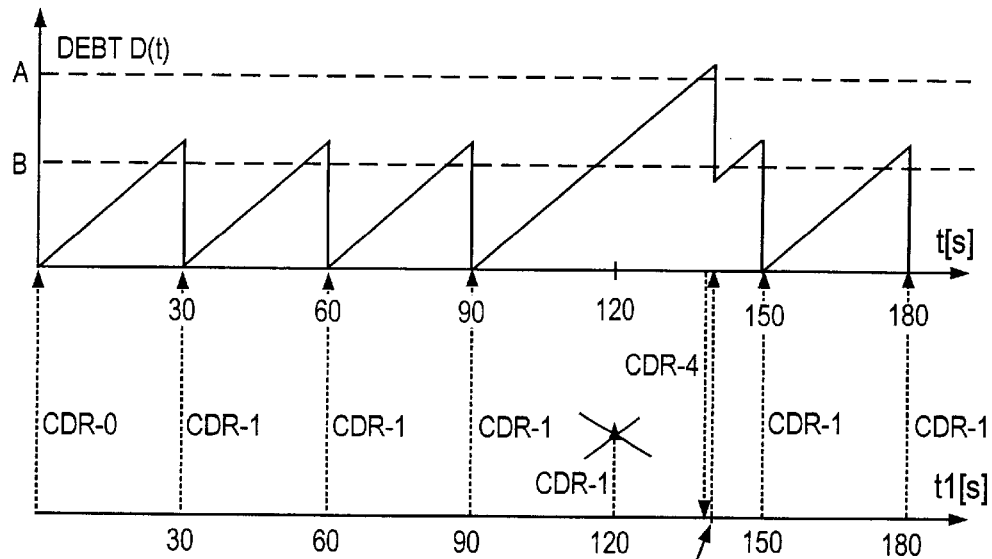
FIG. 7c illustrates the debt incurred by the user when all payments do not arrive at the charging server.
Figure 7D:
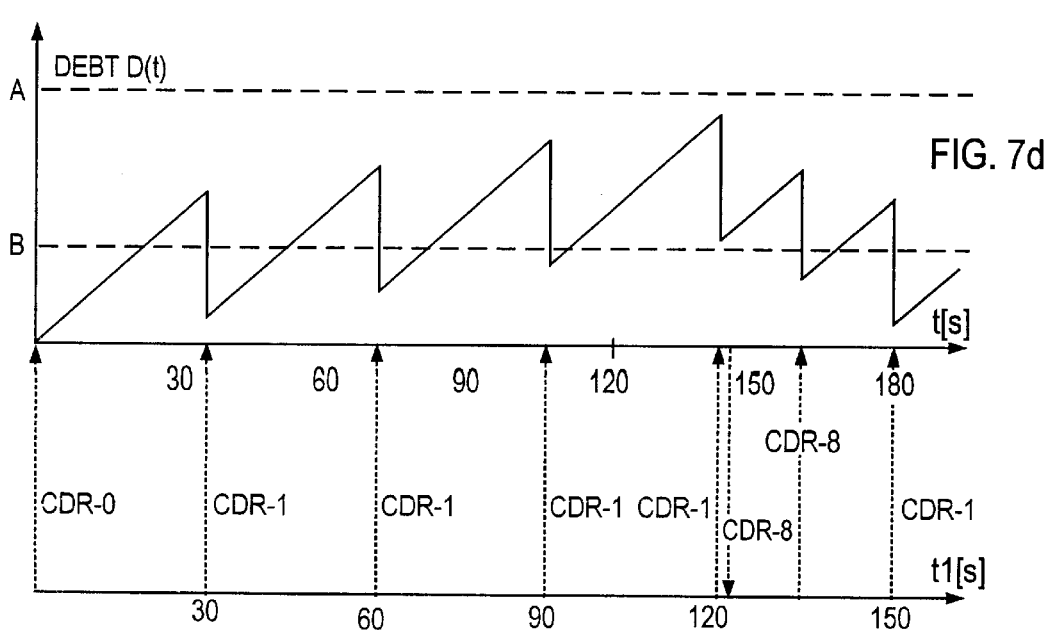
FIG. 7d shows the debt incurred by the user when the clocks of the charging server and the terminal run at different rates.
Figures 7B, 9A:
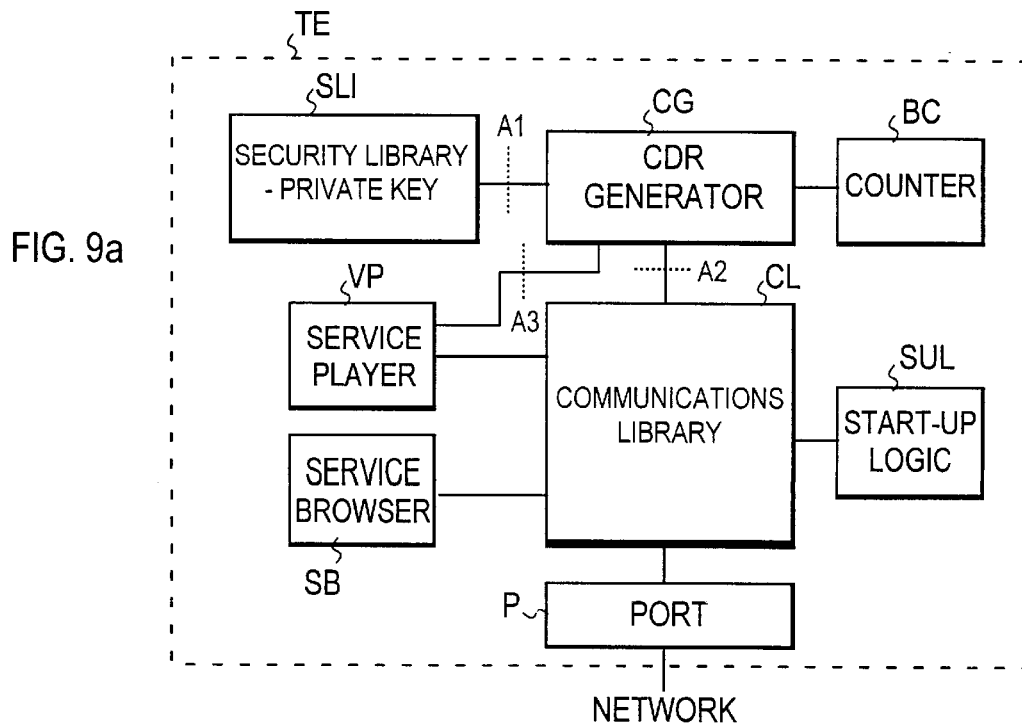
FIG. 7b shows a bill sent to a customer.
FIG. 9a shows the structure of the terminal as a functional block diagram.

FIGS. 7c and 7d illustrate the solving of the aforementioned problems. The time axis t shows the time of the charging server and the time axis t1 the time of the terminal. In the figures the time is shown in seconds. The vertical axis at the top of the figure shows the user debt to the charging server and the bottom of the figure shows the charging records sent by the charging server and the terminal. It is assumed in the figures that the network delay is negligible. In FIG. 7c the clocks run at the same speed, but in FIG. 7d the terminal clock runs slower than that of the charging server. At the moment t1=0 the terminal sends the signed contract (CDR-0) to the charging server. The charging server receives the contract at the moment t=0. The user debt D(t) starts to increase from this moment. When payments do not arrive, the debt increases linearly with respect to time. The rate of increase of the debt (money units per time unit) is defined in the contract. When the charging server receives a payment CDR (CDR-1), the debt decreases by the amount stated by the CDR in question.

After having received the contract, the charging server calculates the value of the debt periodically (for example, once a second). If D(t)>A, the charging server sends a type 4 CDR to the terminal. If the charging server does not receive the missing payment during the time $T_A$, it terminates the contract. FIG. 7c shows a situation in which a payment CDR (CDR-1) sent at the moment t1=120 does not arrive at the charging server. Because of this the debt exceeds the threshold value A before the next regular payment. The charging server sends a type 4 CDR to the terminal and the terminal sends the payment CDR again as a response. It is also possible to define the maximum time which the charging server can operate without a payment CDR. If this time expires, the charging server sends a type 4 CDR.

The charging server verifies the amount of debt at least after each regular payment. If the terminal clock runs slower than the clock of the charging server, as shown in FIG. 7d, the amount of outstanding debt after the payment increases payment by payment. When the amount of outstanding debt after the payment exceeds the threshold value B, the charging server sends a type 8 CDR (synchronization), which includes information about the amount of the desired payment, to the terminal. The terminal sends, as a response, a signed synchronization CDR. If the charging server does not receive the missing payment within the time $T_B$, it terminates the contract. Alternatively, only threshold A is used, in the above-described manner, for terminating the service, whereas threshold B is used only for notification.

All charging information required in the system is transferred in the consecutive fields of protocol messages (charging records). FIG. 8 shows the fields used in charging records:

TYPE: States the type of the CDR, that is, which one of the eight above-mentioned charging records is in question.

LENGTH: This field states the total length of the CDR in bytes, including type and length fields.

CONTRACT NUMBER: This field includes an integer number given by the charging server. The number is the same for all CDRs which belong to the same charging session.

SEQUENCE NUMBER: An integer number, which states the generating order of the CDRs during the same charging session. The terminal gives the number 0 to the contract CDR (type 0) it returns. After this it increases the number by one for each CDR. This field is not defined in CDR types 3, 5, 6 and 7, and in type 4 it indicates the sequence number of a missing CDR.

SERVICE IDENTIFIER: The contents of this field state the service for which the customer is charged. The parameter in this field obtains its value as a result of a contract between the billing service provider and the (multimedia) service provider.

SERVICE TYPE: The parameter in this field categorizes the services into different classes for statistical purposes. For example: Web pages, Video-on-Demand, file transfer, etc.

STARTING TIME: The parameter in this field shows the current time for CDR types 0 and 5 and also 3, 4 and 6, and the starting time of the charging period for types 1 and 2.

ENDING TIME: The parameter in this field defines the ending of the charging session for CDRs of types 1 and 2. In CDRs of types 0 and 5, the field parameter specifies how often the charging server expects to receive a payment CDR. In CDRs of other types this parameter is not defined.

IDENTIFIERS: The parameter in this field states the customer, charging server and server identifiers. The identifiers can be integer numbers or network addresses, but they must be unique within the billing system.

METHOD OF PAYMENT: The parameter in this field is defined for CDRs of types 0, 5, 1 and 2. The methods of payment may be categorized, for example, as follows: free, one-time charge (one CDR), periodical or externally triggered, that is, another process in the terminal may trigger it. For example, the terminal video player can trigger the CDR generation once a minute, if an acceptable video signal has been received during the most recent minute. An implementation in which the charging server triggers the CDR generation by using the parameter of the method of payment field is described later.

AMOUNT OF MONEY: This field states the customer's debt (either for the entire session or for a time period between two CDRs).

TRAFFIC DATA: This field contains information sent from the terminal's external application to the terminal and further to the network.

SIGNATURE: This field contains the customer's digital signature, which is used for the authentication of the CDR.

In the Appendix 1, enclosed in this application, the CDR structure is described in more detail by using the Abstract Syntax Notation 1 (ASN.1), which is a common description language used in the field of telecommunications for describing data structures. The appendix also describes the structure of the aforementioned messages Init_Service, START, OK and CANCEL.

Charging records and the aforementioned messages can be sent, for example, in the data field of IP packages, which may contain one or several charging records.

The charging functions correctly when the network access and payments are in synchronization with one another, i.e. when the paying customers have access to the network providing the services and the non-paying customers do not have access. For example, because of a fault the situation may sometimes change so that the router prevents the paying customers from accessing the network providing the services or allows access for non-paying customers (who do not send payment CDRs). To correct such a situation the access server polls the router and the charging server. From the router the access server gets the access list and from the charging server the IP addresses of the customers who pay at the moment in question for access to the network. If the address of a paying customer is not included in the access list, the access server adds the address to the list. If an address included in the access list is not included in the paying customers of the charging server, the access server removes the address from the list. The polling interval can be made to be controllable so that the access service provider can set the desired interval.

FIG. 9a shows the operation of the terminal (CT) as a functional block diagram. As regards the invention, the core of the equipment is the CDR generator CG, which generates charging records. Connected to the CDR generator is the security library SLI. Its memory contains the customer's private encryption key and it handles the signing of the charging records. The CDR generator creates the CDRs and sends them to the security library where they are signed by using the customer's private encryption key. The security library returns the signed CDRs to the CDR generator, which sends them further to the charging server WD.

If the application or the environment is such that encrypted messages must be transferred between the terminal and the charging server, the security library handles the encryption, signing and signature verification.

The security library can be implemented as a hardware-based, or a software-based solution. However, the hardware based solution is more secure. The security library, or part of it, can be implemented, for example, in the manner described above by using a smart card which contains, for example, the private encryption key of the customer.

Additionally, the terminal contains elements for receiving the service. These can include, for example, a service player VP, which can be a video player, which shows the video signal received from the network and which can also give the CDR generator commands for generating the charging records. The service browser SB, the service player VP and the CDR generator are connected to the network via the communications library CL of the terminal. The CL forms the protocol stack according to which the terminal operates. This protocol stack can be, for example, a TCP/IP stack, for example, Microsoft Winsock.

The start-up logic unit SUL of the terminal handles the sending of the starting message to the access server when the user inserts the smart card in the reader.

The terminal can also contain a charge counter BC, which the customer can use to check the accuracy of the bill sent by the service provider. Additionally, the terminal can have different components for monitoring the quality of service (QoS) of the received information. For example, a video player can order the source to stop transferring information when the quality of service falls below a certain level.

FIG. 9b illustrates in more detail the functional block diagram of the CDR generator. The contract logic unit CLU1 handles the generation of charging records on the basis of information stored in the configuration database CDB. It contains the logic which transfers the received contract information to the graphical user interface GUI and generates the kind of charging records described above. This logic includes timing components TM, which define the time between two consecutive CDRs. The contract logic unit CLU1 is connected to the communications library and the network via an external control interface ECI and to the service player via an internal control interface ICI. The external control interface makes the conversion between the internal and external CDR format. The internal control interface handles message transfer between the service player and the contract logic unit and makes the necessary conversions between the message format used by the service player and the internal message format of the equipment. The connection between the internal control interface and the service player (interface A3) can be implemented, for example, by using a communications library (TCP socket). The configuration database CDB is used for storing the settings the user has made (user preferences) and it can be used for storing information about different services (for example, movies), which are presented to the customer on the basis of the received service identification. This database can be implemented, for example, by using Microsoft Access or Borland Paradox. The configuration database is controlled using the management unit MM. The management unit, the configuration database and the contract logic unit are all connected to the graphical user interface (GUI) of the device. The GUI can be implemented by using, for example, Java applets or the Microsoft Visual Basic programming tool. Part of the configuration database can be located in the network.

If the service player is designed, for example, for Video-on-Demand, it can be implemented, for example, by using a personal computer and a program designed for Video-on-Demand services. One such program is StreamWorks produced by Xing Technology Inc., USA.

The management unit and the contract logic unit are connected to the security library via the A1 interface. The security library and the A1 interface can be implemented, for example, by using the SETCOS 3.1 smart card (and smart card reader) produced by Setec Oy or by using some equivalent product, which is based on international standards for smart cards. (The international standardization organization ISO has defined a series of smart card specifications as follows: ISO 7816-1 (physical dimensions), ISO 7816-2 (location of contacts), ISO 7816-3 (transmission protocols) and ISO 7816-4 (command and file structures).)

A user can have several different smart cards which are each used to open a connection of a certain type. One card can be used, for example, to open a full featured Internet connection and another card (whose subscriber is the employer), for example, only a connection to the LAN at the workplace.

FIG. 10 illustrates the structure of the charging server WD as a general level block diagram. The core of the equipment is the contract logic unit CLU2, which has access to the service database SED, the subscriber database SUD and the charging database BD. The service database contains information about the services of different service providers and the parameters for charging for the use of the services. The charging server can also change the charging parameters independently, for example, on the basis of the time of the day. The subscriber database contains the customer data for the operator managing the charging server (including the public key of each customer). The charging records received from the terminals are stored in the charging database. An encryption block CM is associated with the contract logic unit. The CM handles the verification of the charging record signatures. This block corresponds to the SL block of the terminal. The contract logic unit receives from the terminals charging records signed by the terminals and sends them to the encryption block to be verified. The contract logic unit stores the accepted charging records in the charging database. The contract logic unit is connected to the network through the communications library CL' which forms the protocol stack defining the connection to be made.

In practice, the contract logic units described above can be implemented, for example, by using tools based on the international System Description Language (SDL) standard, for example, the SDT tool of Telelogic AB.

The databases of the charging server can be held in the memory MS described above (FIG. 3) and located in connection with the charging server. In addition, the charging records can be stored in a separate mass memory MS1 (FIG. 3), which is located between the charging server and the billing system in the network and which is organized in such a manner that the billing system can easily handle the information stored in it. By using this kind of separate database it is possible to let the service providers use the database for different kinds of queries in order to develop their services. The service provider, or a customer can, for example, ask about the charging of a certain service during a charging period (for example, by using E-mail).

Figure 11:
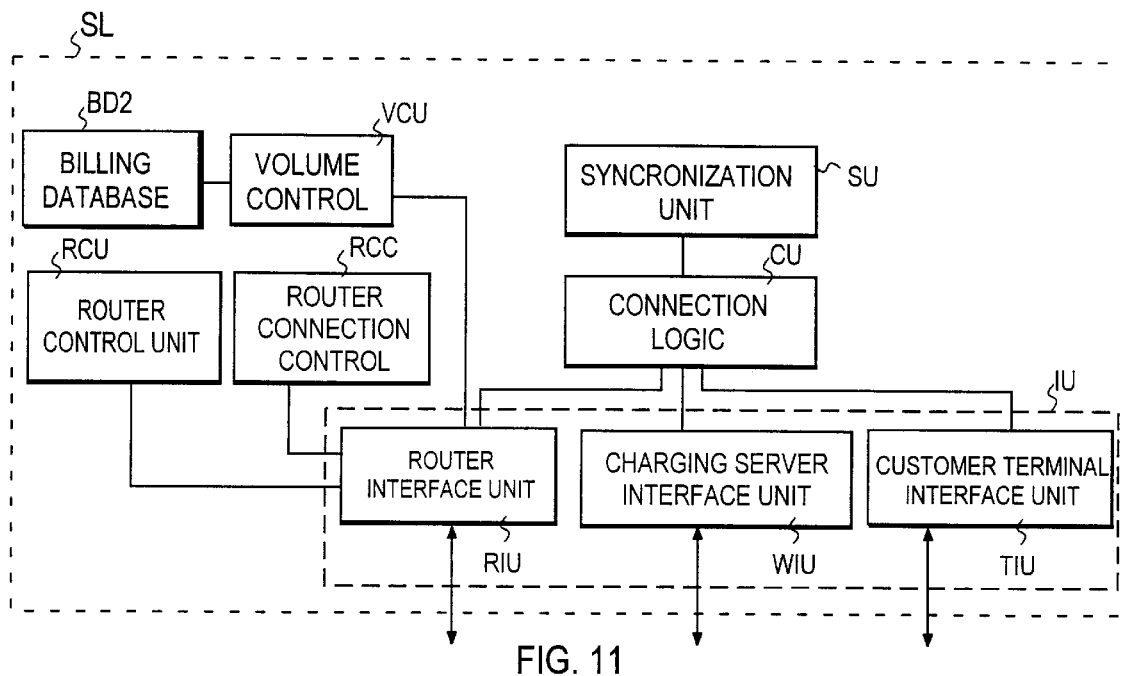
FIG. 11 illustrates the structure of the access server as a functional block diagram.

FIG. 11 illustrates the structure of the access server SL as a functional block diagram. For external connections the server includes an interface unit IU which comprises the router interface unit RIU, charging server interface unit WIU and terminal interface unit TIU. The TIU receives the aforementioned starting message Init_Service from the terminal and starts the billing session for the customer in question. The router interface unit monitors the router access list and the charging server interface unit handles the communication with the charging server. The connection logic CLO is a simple state machine which connects the different interface units to one another. The connection logic also maintains a list of all open connections and two queues, one of which contains the connections which are to be closed and the other the connections which are to be opened.

The router control unit RCU, which includes the router command set, controls the router by handling the maintenance of the aforementioned access list.

The synchronization unit SU handles the synchronization of the aforementioned payments and access rights by comparing, at certain intervals, the router's list of open connections to addresses of paying customers. Said addresses are received from the charging server. Any detected conflicts are corrected so that no error longer than said interval can occur in charging.

The router connection control unit RCC monitors the connection between the access service and router. Because it is assumed in the example that the connection between the router and the access server is a Telnet connection, the router breaks the connection if it is unused for too long a time. The task of the router control unit is to open the connection if the router happens to break it, for example, for the aforementioned reason or because of other interferences occurring in the connection.

The volume monitoring unit VCU and the charging database BD2 used by it are included in the access server at least in the case in which it is desirable to also perform charging on the basis of a transferred volume of data. In this case the control unit reads through the router interface unit from the router access list the desired packet counts and stores the data in the charging database BD2 so that for each contract number is stored the number of packets and the IP address used by the terminal for the connection. The access server charging database data are combined in the billing phase with the data of the charging server charging database on the basis of contract numbers. In this way it is possible to take into account the transferred data volume in the bill.

Figure 12:
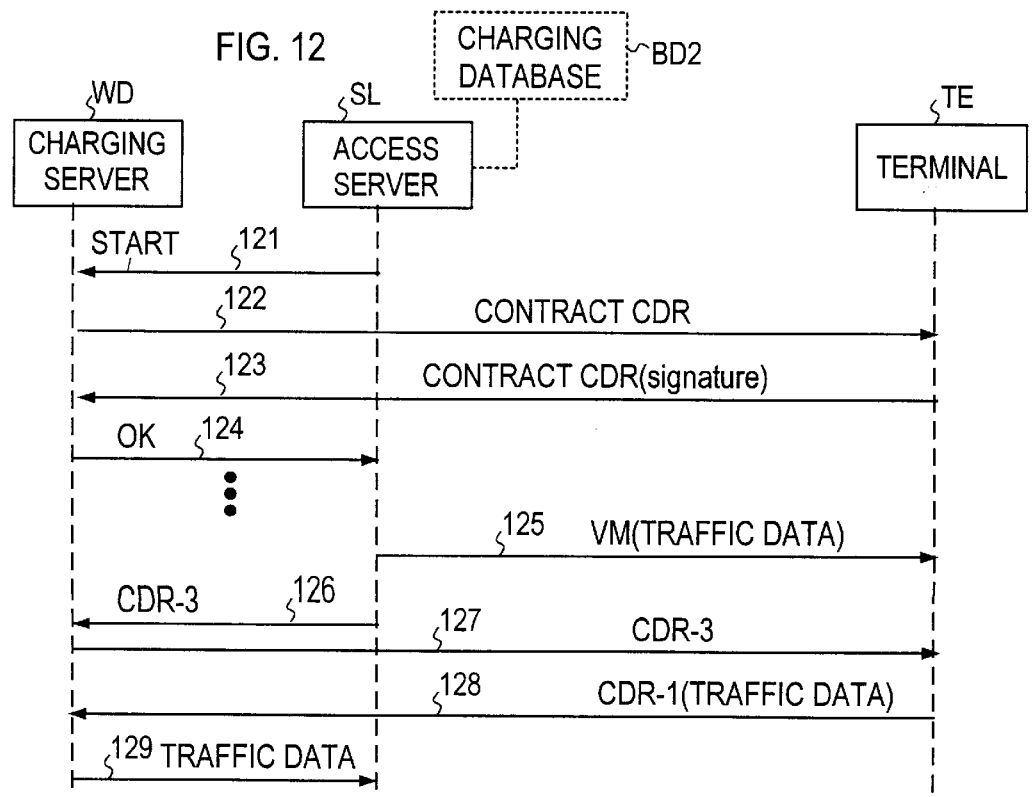
FIG. 12 illustrates the message exchange related to a preferred additional feature of the system.

The embodiment described above does not feature the addition of the subscriber signature to the packet count data, so the user would be forced to take it on trust that the packet counts determined by the system are correct. However, in all other cases the terminal can verify that the charging is handled correctly. To solve this problem, a two-phase method is adopted. First, the access server notifies the terminal when the volume to be charged has increased by a certain value (for example, 50 Mb). In this manner the terminal can follow the volume count performed by the access server and compare it to its own count. Second, the access server sends each CDR related to volumes to the charging server which further relays it to the terminal to be signed. The procedure is similar to the signing of the contract described above; it provides the terminal user an opportunity to monitor charging and makes it difficult to repudiate bills. This method is illustrated in more detail in the following by referring to FIG. 12 which shows the communication between different elements.

First, the system creates a separate "volume agreement" in the manner described above as a contract which is triggered externally (arrows 121 to 124). The access server reads the desired packet counts from the router and stores the data in the charging database BD2. When the packet count reaches a predefined limit, the access server sends a signed CDR of type 3 (pulse) to the charging server (arrow 126). However, prior to this the access server, sends to the terminal traffic data port a message VM which contains the information about the transferred volume of data (indicated by the term "traffic data"). In this manner the volume information is included in the next CDR to be signed, and an opportunity to verify the volume before the CDR is signed is given to the user, or at least to the terminal.

When it receives a CDR of type 3 from the access server, the charging server notices that the contract is an externally triggered contract, in which case it sends the CDR in question further to the terminal (arrow 127). If the user or the terminal accepts the volume, the terminal forms a payment CDR, transfers the received data volume information to the traffic data field of this payment CDR, and sends the payment CDR in question to the charging server (arrow 128). The charging server further relays the CDR or the data included in it to the access server (arrow 129) which verifies at least the data included in the traffic data field. According to the verification the access server either breaks off the service or lets it continue. In this case the service thereby probably consists of a combined service which includes both a time-based and an volume-based contract.

From the terminal's point of view the volume-based charging described above occurs in the following manner. The charging server sends a new contract (arrow 122) whose method of payment parameter contains a value which indicates a payment triggered externally. When the payment is required, the terminal receives a CDR of type 3 which includes the data about the amount of the payment required. In this case the terminal either automatically accepts the payment or the data are presented on the terminal display to the user who can decide whether he/she will accept the payment. If the payment is accepted, the terminal changes the CDR type to 1 (payment CDR), signs the CDR, and sends it to the charging server (arrow 128).

The payment can also be triggered by some other external entity, such as the charging server which sends the terminal a command which indicates that a payment is required. This kind of command is sent to the socket address corresponding to traffic data. In addition to the actual command ("perform the payment"), the command message also includes the contract number information. After this the terminal performs the payment. In this case, the command only states that a payment is required. The amount of payment, on the other hand, is defined in the contract.

In the manner described above the volume-based charging can be implemented so that the terminal or the user is continuously aware of the size of the bill being incurred. Every payment is accepted, so the repudiation of payments is not possible. Messages only have to be sent when payments are required, so if there is no traffic to or from the terminal, no empty or unnecessary charging messages are generated, either. Because the implementation has been made on the application level, the volume-based charging is not dependent on certain technology, but there can be several "chargers" between the service provider and the terminal who charge simultaneously on the basis of volume.

Although the ADSL environment has been used as an example above, it is clear that the method according to the invention offers the same advantages in any connectionless network where access services are provided so that there is a need to distinguish between the users of a certain network address, or where the user is not necessarily the service subscriber who pays for the service. The terminal can also be connected to a network providing services through a wireless connection. In the future, the connection methods may vary considerably.

Furthermore, the above descriptions refer to situations in which the user network address (IP address) may vary in different service sessions, but remains the same during a single service session. However, the method according to the invention can also be applied in a situation where the subscribers move from one location to another. This can be implemented, for example, by using the Mobile IP protocol. This is a version of the existing IP which supports the mobility of the terminal. (The Mobile IP principle is described, for example, in the article by Upkar Varshney, *Supporting Mobility with wireless ATM*, Internet Watch, January 1997.) Mobile IP is based on the principle that each mobile host has an assigned agent ("home agent") which relays the packets to the current location of the mobile host. When the mobile host moves from one subnetwork to another, it registers with the agent ("foreign agent") which serves the subnetwork in question. The foreign agent performs verifications with the home agent of the mobile host, registers the mobile host and sends the registration information to it. The packets addressed to the mobile host are sent to the original location of the mobile host (to the home agent) from where they are further relayed to the current foreign agent which further relays them to the mobile host. When the principle described above is applied to a system according to the invention, each terminal has an assigned charging server (that communicates with a home agent) and access servers (that communicate with foreign agents) which serve different subnetworks and tell the charging server of each terminal where the terminal in question is currently located. A charging server can be part of a home agent, but charging servers and home agents can also be different entities. Similarly, an access server can part of a foreign agent, but access servers and foreign agents can also be different entities.

It is also essential that the customer's public key can be safely transferred to the charging server near the subscriber so that the charging server in question can verify the charging records. (If the transfer cannot be done safely, it is possible that a third party may change the key during the transfer and in this way cause expenses to the original subscriber.) The subscriber's public key can be transferred, for example, into a database near the charging server into which the charging server has access. The charging server nearest to the subscriber can handle the billing by using the identifier of the subscriber's own charging server. The collected CDRs are sent to the subscriber's own charging server after the service session has ended.

When the terminal moves from one subnetwork to another (i.e. from one access server to another), it is possible to make a new contract, to renegotiate the same contract, or to continue with the same contract, depending on the changes in the conditions caused by the handover. For example, when the operator also changes, it is always possible to negotiate a new contract. If the operator does not change but the quality of service differs significantly from the earlier in the new subnetwork, the same contract can be renegotiated with new conditions. The party which decides on the handover event should also decide whether the old contract should be terminated or continued. On the other hand, the user should always have the possibility of knowing which network he/she is in and under what conditions he/she is receiving the service.

Although the invention has been described here in connection with the examples shown in the attached figures, it is clear that the invention is not limited to these examples as it can be varied within the limits set by the included patent claims. For example, it is possible that the terminal does not send actual charging records to the charging server, but it sends some other (charging-related) messages, which the charging server can use as a basis for generating the charging records itself. For example, the terminal can send so-called keep-alive messages as long as the service lasts, after which the charging server generates, for example, only one charging record in which the duration of the service is the time between the last keep-alive message and the time of accepting the contract.

APPENDIX 1

```
-- The CDR structure
-- ==================
-- In the initial version the encoding is byte-oriented
-- without tag and length fields. ENUMERATED is encoded
-- as one octet if nothing else is specified, INTEGER
-- is encoded as an octet string (length 2, 4 or 8 depending
-- on the maximum size) in MSB first format.
CDR_cdrType ::= ENUMERATED {
   contract (0), -- initial CDR, WD -> Client
   payment (1), -- normal payment CDR
   final (2), -- as above, client stops
   pulse (3), -- indication of new payment
   missing_seq (4), -- CDR with seq.num.lost
   mod_contract (5), -- contr.renegotiation
   abort (6), -- end connection, no money inc.
   E_cash (7) -- e_cash carrier CDR, type B
}
-- Types 0..6 are overloaded onto a CDRtypeA, type 7 uses
-- a CDRtypeB
CDR_network ::= ENUMERATED {
   unknown (0),
   TCP/IP (1),
   ISDN (2)}
CDR_serviceTypeType ::= ENUMERATED {
   unknown (0),
   . . .
}
CDR_timeType ::=
   hundrethOfSec OCTET STRING (SIZE(1)),
   seconds OCTET STRING (SIZE(1)),
   minutes OCTET STRING (SIZE(1)),
   hours OCTET STRING (SIZE(1)),
   days OCTET STRING (SIZE(1)),
   year_lo OCTET STRING (SIZE(1)),
   year_hi OCTET STRING (SIZE(1))}
CDR_identifierType ::= SEQUENCE {
   type ENUMERATED {system_assigned(0),
   E164_addr(1), . . . }
   data OCTET STRING (SIZE (16))
}
CDR_paymentMethodType ::= ENUMERATED {
   free (0), -- no charge
   one_time (1), -- agreement valid for one payment
      periodic (2), -- time-based
      wd_req (3), -- payment triggered by a WD msg
      ext_trig (4) -- paym. trigg. by an extern. client. appl.
}
CDR_currencyType ::= NUMERATED {
   majorType ENUMERATED {bill(0), E_cash(1)},
   currency ENUMERATED {FiM (0), USD(1), . . . }
}
   -- encoded in one octet so that majorType occupies
   the most significant bit and currency bits 0–6
CDR_moneyAmountType ::= SEQUENCE {
```

-continued

APPENDIX 1

```
   currency CDR_currencyType,
   value INTEGER(0..MAX_WORD)
-- in case E_cash is used, the value defines the
-- sequence number of the E_cash carrier CDR
CDR_signatureType ::= SEQUENCE {
   present ENUMERATED {absent(0), present(1)},
   type ENUMERATED {RSA-with-MD5(0), DES-with-MD5(1)},
   signature OCTET STRING SIZE (64)
}
CDRformatA ::= SEQUENCE {
   type CDR_cdrType,
   length INTEGER (0..MAXS_WORD),
   contractNr INTEGER (0..MAX_D_WORD),
   sequenceNr INTEGER (0..MAX_WORD),
   serviceId INTEGER (0..MAX_D_WORD),
   serviceType CDR_serviceTypeType,
   startTime CDR_timeType,
   endTime CDR_timeType,
   clientId CDR_identifierType,
   watchdogId CDR_identifierType,
   serverId CDR_identifierType,
   payMethod CDR_paymentMethodType,
   moneyAm CDR_moneyAmountType,
   trafficData OCTET STRING (SIZE(8))
   signature CDR_signatureType
}
CDRformatB ::= SEQUENCE {
   type CDR_cdrType,
   length INTEGER (0..MAX_S_WORD),
   contractNr INTEGER (0..MAX_WORD),
   sequenceNr INTEGER (0..MAX_WORD),
   e_cash OCTET_STRING(SIZE(0..200))
}
Start ::= SEQUENCE {
   MessageType OCTET_STRING(SIZE(1))
DEFAULT(1)
   MessageLen INTEGER(0..MAX_LEN),
   ClienAddr NWAddr,
   ServerAddr NWAddr,
   ServerId CDR_identifierType,
   ServiceId INTEGER (0..MAX_D_WORD),
   ConnId INTEGER (0..MAX_WORD)
}
OK ::= SEQUENCE {
   MessageType OCTET_STRING(SIZE(1))
DEFAULT(2)
   MessageLen INTEGER(0..MAX_LEN),
   ContractId INTEGER (0..MAX_D_WORD),
   ConnId INTEGER (0..MAX_WORD)
}
Cancel ::= SEQUENCE {
   MessageType OCTET_STRING(SIZE(1))
DEFAULT(3)
   MessageLen INTEGER(0..MAX_LEN),
   ContractId INTEGER (0..MAX_D_WORD),
   ConnId INTEGER (0..MAX_WORD)
}
```

What is claimed is:

1. A method for implementing an access service in a telecommunications network including an access network, a services network providing services, and user-operated terminals connected to the access network, the method comprising the steps of providing the access service by connecting, through interface elements, the user terminal to the services network providing the services, generating at least one charging record as a response to the access service, said record being relayed to billing means for charging a subscriber of the access service for the access service, using the terminal to generate charging messages provided with subscriber-specific digital signatures to the network, verifying outside the terminal the signatures generated by the terminal, connecting the terminal to the services network providing the services, if said messages provided with subscriber-specific digital signatures are successfully verified, received according to a predefined rate and the signatures included in the messages are verified as valid, and sending from the terminal data concerning the current user of the terminal, and using said data to verify validity of the signatures and to target the charging messages received from the terminal in order to bill the subscriber in question.

2. A method according to claim 1, wherein the terminal, when it has access to the services network providing the services, is used to generate at certain intervals charging records provided with a subscriber-specific digital signature, each record representing the charging for a certain connection time.

3. A method according to claim 2, wherein the terminal, having gained access to the services network providing the services, is always sent a payment request message when the volume of data transferred during the service has reached a predefined limit.

4. A method according to claim 3, wherein the terminal is sent information about the volume of data corresponding to the payment request message or about the amount of the payment corresponding to the payment request message.

5. A method according to claim 1, wherein at least a part of the connection between the interface elements and the terminal is implemented as a wireline ADSL connection.

6. A method according to claim 1, wherein the connection between the interface elements and the terminal is implemented as a wireless connection.

7. A method according to claim 6, wherein the charging server is part of a home agent defined in mobile IP protocol, and the access server is part of a foreign agent defined in the mobile IP protocol, the foreign agents serving different subnetworks and informing the charging server of each terminal as to in which subnetwork the terminal in question is currently located.

8. A method according to claim 6, wherein the charging servers communicate with home agents defined in mobile IP protocol and the access servers with foreign agents defined in the mobile IP protocol, the foreign agents serving different subnetworks and informing the charging server of each terminal, as to in which subnetwork the terminal in question is currently located.

9. A method for implementing an access service in a telecommunications network including an access network, a services network providing services, and user-operated terminals connected to the access network, the method comprising the steps of providing the access service by connecting, through interface elements, the user terminal to the services network providing the services, generating at least one charging record as a response to the access service, said record being relayed to billing means for charging a subscriber of the access service for the access service, using the terminal to generate charging messages provided with subscriber-specific digital signatures to the network, using at least one separate charging server so that each terminal has an assigned charging server that receives the charging messages generated by the terminals, wherein at least the network address of each terminal in question is transferred to the charging server, when the user starts the connection, verifying outside the terminal the signatures generated by the terminal, connecting the terminal to the services network providing the services, if said messages provided with subscriber-specific digital signatures are successfully verified, and sending from the terminal data concerning the current user of the terminal, and using said data to verify validity of the signatures and to target the charging messages received from the terminal in order to bill the subscriber in question.

10. A method according to claim 9, wherein the address of the terminal is transferred through a separate access server.

11. A method according to claim 9, wherein the charging server, in response to having received the network address, sends the terminal a contract message stating that the user should make a contract relating to the access service.

12. A method according to claim 11, wherein the terminal automatically accepts the contract.

13. A method according to claim 11, wherein the terminal prompts the current user of the terminal to accept the contract.

14. A method according to claim 11, wherein the terminal returns the contract message with a subscriber-specific digital signature, the charging server verifies the signature, and when it detects that the signature is valid, the charging server starts a process for connecting the terminal through the interface elements to the services network providing the services.

15. A method according to claim 14, wherein the data about the subscriber for the current user are transferred to the charging server in the signed contract message.

16. A method according to claim 14, wherein the charging server starts the process by giving a connection command to the access server which is used to control the interface elements.

17. A method according to claim 16, wherein a router is used as the interface elements, and the access server maintains a router access list which includes the addresses of the terminals given access through the router to the services network providing the services.

18. A method according to claim 17, wherein the access server compares at predefined intervals the list of paying terminals, stored in the charging server, to the list of paying terminals, stored in the router, and connects or disconnects terminal connections to the services network providing the services, if the router list does not conform to the charging server list.

19. A method according to claim 9, wherein data about the subscriber for the current user are transferred to the charging server in the same message which contains the information about the network address of the terminal which starts the connection.

20. A method according to claim 9, wherein the charging server, in response to having received the address, queries the terminal as to the subscriber identity data.

21. A method according to claim 9, wherein billing information included in the charging messages is sent from the charging server to a separate billing system for forming subscriber-specific bills.

22. A method according to claim 21, wherein the billing information is sent to the billing system of the public switched telephone network.

23. A method according to claim 9, wherein a message including said network address of the terminal is routed to said charging server via another charging server.

24. A method according to claim 9, wherein the charging server determines, after having received from the terminal a charging message indicating a payment, the current amount of outstanding debt of the user, and, if the debt remaining exceeds a predefined threshold value after said payment, the charging server sends the terminal a message which states that an additional payment is required from the terminal.

25. A method for implementing an access service in a telecommunications network including an access network, a services network providing services, and user-operated terminals connected to the access network, the method comprising the steps of providing the access service by connecting, through interface elements, the user terminal to the services network providing the services, generating at least one charging record as a response to the access service, said record being relayed to billing means for charging a subscriber of the access service for the access service, using the terminal to generate charging messages provided with subscriber-specific digital signatures to the network, and on a service-specific basis for each service which is being used from the services network providing the services, verifying outside the terminal the signatures generated by the terminal, connecting the terminal to the services network providing the services, if said messages provided with subscriber-specific digital signatures are successfully verified, and sending from the terminal data concerning the current user of the terminal, and using said data to verify validity of the signatures and to target the charging messages received from the terminal in order to bill the subscriber in question.

26. A method for implementing an access service in a telecommunications network including an access network, a services network providing services, and user-operated terminals connected to the access network, the method comprising the steps of providing the access service by connecting, through interface elements, the user terminal to the services network providing the services, generating at least one charging record as a response to the access service, said record being relayed to billing means for charging a subscriber of the access service for the access service, using the terminal to generate charging messages provided with subscriber-specific digital signatures to the network, using at least one separate charging server so that each terminal has an assigned charging server that receives the charging messages generated by the terminals, wherein the terminal displays a list of access services available for the current user of each terminal, verifying outside the terminal the signatures generated by the terminal, connecting the terminal to the services network providing the services, if said messages provided with subscriber-specific digital signatures are successfully verified, and sending from the terminal data concerning the current user of the terminal, and using said data to verify validity of the signatures and to target the charging messages received from the terminal in order to bill the subscriber in question.

27. A method according to claim 26, wherein the list is updated immediately before displaying it.

28. A method according to claim 26, wherein the list is updated whenever the terminal obtains access to the services network providing the services.

29. A system for implementing an access service in a telecommunications network, the system including an access network, a network providing services, and user-operated terminals connected through the access network to the network providing services, the system comprising connection means for connecting, through interface elements, the user terminal to the services network providing the services, and charging record generation means for generating at least one charging record (CDR) whenever a connection is made between the user and the services network providing the services, message generation means in the terminals, for generating charging messages from the terminals, said means being provided with signature means for adding a subscriber-specific digital signature to a charging message, verification elements, for verifying the charging messages generated by the terminals, identification means, for identifying the subscriber associated with the current user of the terminal, and the connection means being responsive to the verification means for connecting the terminal to the services network providing the services when the terminal sends charging messages that are successfully verified, and if said messages are received according to a predefined rate and the signatures included in the messages are verified as valid.

30. A method according to claim 29, wherein the connection means includes a separate server located within the network to control the interface means in accordance with the messages sent by the charging server, the interface means comprising a router.

31. A method according to claim 29, wherein the identification means comprises a smart card reader which is connected to the terminal, and a user-operated smart card on which is stored at least the identifier of the subscriber associated with the user.

* * * * *